United States Patent [19]
Cook

[11] Patent Number: 5,331,470
[45] Date of Patent: Jul. 19, 1994

[54] FAST FOLDED WIDE ANGLE LARGE REFLECTIVE UNOBSCURED SYSTEM

[75] Inventor: Lacy G. Cook, El Segundo, Calif.

[73] Assignee: Hughes Aircraft Company, Los Angeles, Calif.

[21] Appl. No.: 989,279

[22] Filed: Dec. 11, 1992

[51] Int. Cl.⁵ .................... G02B 17/06; G02B 23/06
[52] U.S. Cl. .................................... 359/859; 359/861
[58] Field of Search ................. 359/366, 859, 861

[56] References Cited

U.S. PATENT DOCUMENTS

| | | | |
|---|---|---|---|
| 4,240,707 | 12/1980 | Wetherell et al. | 359/859 |
| 4,265,510 | 5/1981 | Cook | 359/366 |
| 4,598,981 | 7/1986 | Hallam et al. | 359/366 |
| 4,733,955 | 3/1988 | Cook | 359/859 |
| 4,804,258 | 2/1989 | Kebo | 359/366 |
| 4,834,517 | 5/1989 | Cook | 359/366 |
| 5,144,476 | 9/1992 | Kebo | 359/859 |
| 5,170,284 | 12/1992 | Cook | 359/861 |

Primary Examiner—Edward K. Look
Assistant Examiner—James A. Larson
Attorney, Agent, or Firm—Hugh P. Gortler; M. W. Sales; W. K. Denson-Low

[57] ABSTRACT

A wide angle large reflective unobscured system (10) has a primary (12), secondary (14), tertiary (18) and fold (16) mirror. The primary (12) and secondary (14) mirrors act as a non-reimaging afocal telescope of the Galilean type and relay a virtual entrance pupil to the fold mirror (16) which is positioned at the system aperture stop. The fold mirror (16) directs the energy to the tertiary mirror (18) which acts to direct and focus the energy at a viewing plane. The resulting telescope provides a wide two dimensional field of view which can exceed 20°×40°, and operates at optical speeds about F/1.0.

19 Claims, 1 Drawing Sheet

FAST FOLDED WIDE ANGLE LARGE REFLECTIVE UNOBSCURED SYSTEM

BACKGROUND OF THE INVENTION

1. Technical Field

The present invention relates to a reflective optical system and, more particularly, to a compact all-reflective optical system with a wide field of view and very fast optical speed.

2. Discussion

All-reflective optical systems are often utilized in certain imaging applications where chromatic aberrations, thermal behavior, size, weight or cost restricts the use of conventional refractive lenses. Additionally, certain imaging applications require optical systems with large unobstructed two dimensional fields of view in order that particular operations or functions such as navigation, pilotage or driving can be accomplished based on the images provided by the optical system. Further, certain imaging applications require optical systems with expanded light gathering capability. Such optical systems must therefore operate at fast optical speeds.

One such type of telescope is a wide angle large reflective unobscured system (WALRUS) which forms a high quality image of an extremely wide angle object field on a flat image surface. The WALRUS is all-reflective and thus has no chromatic aberrations. An eccentric portion of the rotationally symmetric field of the telescope is typically used, such that no part of the aperture is obscured. The mirrors are surfaces of revolution described exclusively as flats, spheres or conic sections, all of which are easily tested and verified in manufacturing using well known conventional tests. Each mirror shares a common axis of rotational symmetry facilitating telescope alignment. Occasionally, one mirror is used twice providing the function of a secondary and tertiary mirror while eliminating the need to fabricate and align a separate tertiary mirror.

One such type of WALRUS optical system is illustrated in the article entitled "Easily Fabricated Wide Angle Telescope" by R. Calvin Owen, 430 SPIE, Volume 1354, International Lens Design Conference (1990). While this WALRUS provides a wide field of view, it is large and functions at a relatively slow optical speed. The system provides a planar fold mirror and the mirror surfaces are only spherical and conic. Further, the system provides a circular aperture.

Another wide angle large reflective unobscured system is illustrated in U.S. Pat. No. 4,598,981. This patent illustrates a three-mirror system which provides a long telescope. Also, the mirrors of the system are spherical or conic surfaces and the system optical speed is relatively slow.

Thus, there exists a need in the field to provide an optical system which provides a requisite wide angle field of view, is relatively compact reducing the length of the design, corrects all aberrations and significantly increases the optical speed of the system.

SUMMARY OF THE INVENTION

According to the teachings of the present invention, a compact reflective optical system is provided which generates a wide field of view and has very fast optical speed. The present invention provides a field of view of at least 13.5° vertical by 27° horizontal with an optical speed of about F/1.0. Also, the image quality of the system is in the submilliradian range. Further, the invention lends itself to the capability of being produced in high volume at relatively low cost.

In the preferred embodiment, the all-reflective optical system is comprised as follows. A primary mirror with a desired surface configuration is positioned to receive and reflect energy. A secondary mirror, also with a desired surface configuration, is positioned to receive energy from the primary mirror. The primary and secondary mirrors generally form a non-reimaging afocal telescope of the Galilean type. Additionally, the primary and secondary mirrors relay a virtual entrance pupil located behind the primary mirror to a real aperture stop position located after the secondary mirror. A fold mirror is positioned at the aperture stop location to receive and reflect the energy from the secondary mirror. A tertiary mirror, also having a desired surface configuration, is positioned to receive energy from the fold mirror. The tertiary mirror reflects and focuses the energy to a detection plane. The three powered mirrors of the telescope together with the fold mirror form a compact optical system which provides a wide two-dimensional field of view and a very fast optical speed. Fields of view exceeding 20° by 40° can be achieved simultaneously with optical speeds as fast as F/1.0.

BRIEF DESCRIPTION OF THE DRAWINGS

The various advantages of the present invention will become apparent to those skilled in the art after a study of the following specification and by reference to the drawings in which.

DETAILED DESCRIPTION OF THE PREFERRED EMBODIMENT

Figure 1:
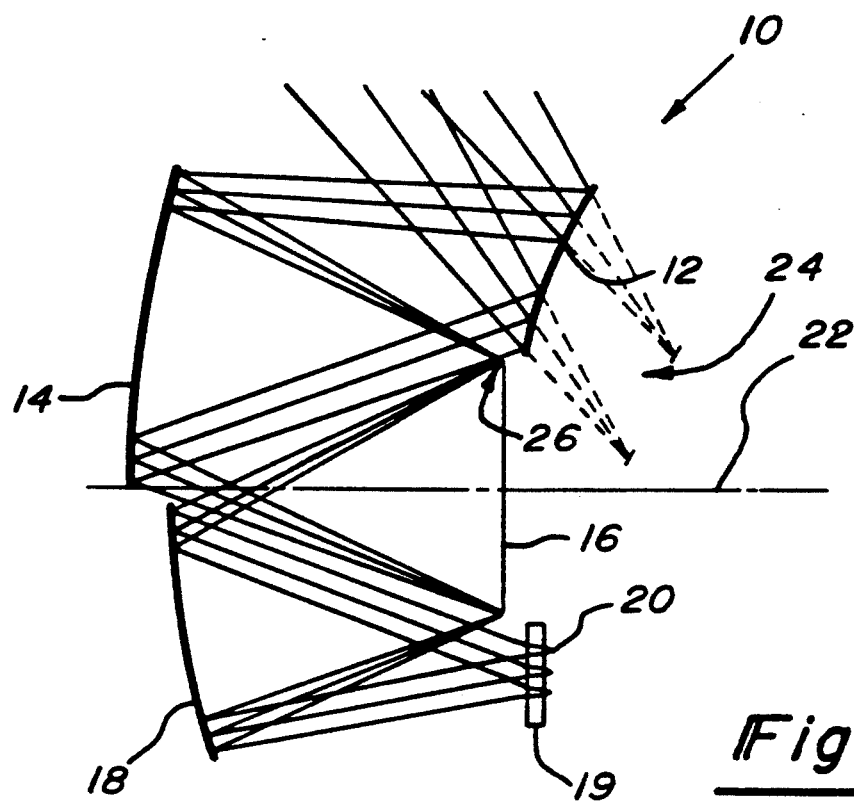
FIG. 1 is a schematic diagram of a vertical ray trace section in accordance with the present invention.
Figure 2:
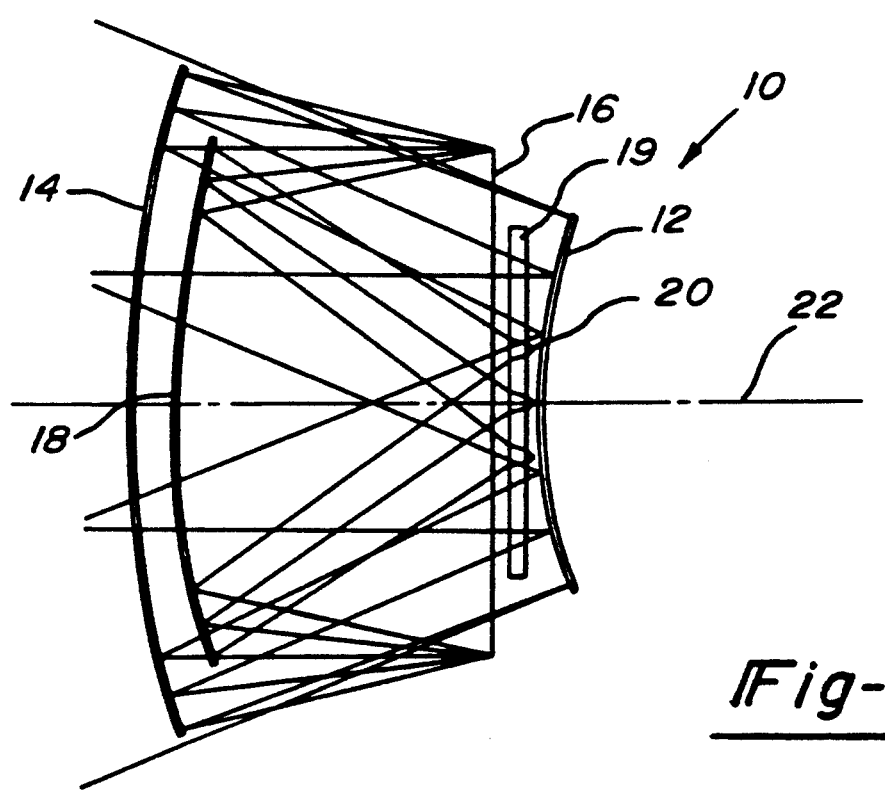
FIG. 2 is a horizontal ray trace section in accordance with the present invention.

Turning to the figures, a compact all-reflective optical system with a wide field of view and very fast optical speed is illustrated and designated with the reference numeral 10. The system 10 includes a primary mirror 12, a secondary mirror 14, a fold mirror 16, and a tertiary mirror 18. The mirrors 12–18 pass the energy through a window 19 and focus the energy at a detection plane 20.

The primary mirror 12 has an axis 22 defining the system optical axis. The primary mirror 12 is a negative power mirror having a mirror surface which is higher order aspheric.

The secondary mirror 14 is a positive power mirror. The secondary mirror 14 has a mirror surface which is a higher order aspheric.

The tertiary mirror 18 is a positive power mirror. The mirror surface of the tertiary mirror 18 is also a higher order aspheric.

The fold mirror 16 is a non-powered mirror. The fold mirror 16 includes a non-planar, preferably a higher order aspheric surface.

The window 19 transmits the energy to the detection plane 20. The window 19 protects the detection plane 20 from contaminants and may be manufactured from a zinc sulfide or germanium material.

The power of the two positive powered mirrors 14 and 18 is balanced by the negative power of the primary mirror 12 to provide a zero Petzval curvature or a flat field condition.

The primary 12 and secondary 14 mirrors form a non-reimaging afocal telescope of the Galilean type at an afocal magnification of 2×. Additionally, these two mirrors relay a virtual entrance pupil 24 located behind the primary mirror 12 to a real aperture stop 26. At the aperture stop 26, the fold mirror 16 is positioned to receive the beam from the secondary mirror 14 and reflect the beam to the tertiary mirror 18. The tertiary mirror 18 focuses and directs the beam to the detection plane 20.

increase in the field of view offset to avoid interference, greater aperture growth can be achieved in the horizontal plane. In the figures shown, the design exhibits a speed of F/1.7 in the vertical plane and F/0.8 in the horizontal plane.

A specific prescription for a wide angle large reflected unobscured system is given in the following table:

TABLE 1

| # | Description | Radius | CC | d | e | THK | Material |
|---|---|---|---|---|---|---|---|
| 12 | primary mirror | 3.533 | −0.41610 | $0.3607 \times 10^{-2}$ | $0.1421 \times 10^{-3}$ | −2.166 | reflective |
| 14 | secondary mirror | 6.643 | −0.83643 | $0.1027 \times 10^{-3}$ | $-0.3942 \times 10^{-4}$ | 2.166 | reflective |
| 16 | fold mirror (aperture stop) | ∞ | — | $0.7457 \times 10^{-3}$ | $0.3120 \times 10^{-4}$ | −2.093 | reflective |
| 18 | tertiary mirror | 5.155 | 0.49430 | $-0.7711 \times 10^{-4}$ | $0.9569 \times 10^{-5}$ | 2.193 | reflective |
| — | window | ∞ | — | — | — | 0.100 | ZnS (n = 2.6) |
|  |  | ∞ | — | — | — | 0.050 | air |
| 20 | focal surface | ∞ | — | — | — | — | — | field of view: 13.5° V × 27.0° H
field offset: 54° V to center
aperture stop size: 1.49 V × 2.98 H A second prescription for a wide angle large reflected unobscured system is given in the following table:

TABLE 2

| # | Description | Radius | CC | d | e | f | THK | Matl |
|---|---|---|---|---|---|---|---|---|
| 12 | primary mirror | 3.273 | −0.41085 | $0.3556 \times 10^{-2}$ | $0.2274 \times 10^{-3}$ | $0.5418 \times 10^{-5}$ | −2.166 | refl |
| 14 | secondary mirror | 6.233 | −0.62531 | $0.1891 \times 10^{-4}$ | $-0.3572 \times 10^{-5}$ | $-0.3883 \times 10^{-5}$ | 2.166 | refl |
| 16 | fold mirror (aperture stop) | ∞ | — | $0.5958 \times 10^{-3}$ | $0.2392 \times 10^{-5}$ | $-0.4877 \times 10^{-7}$ | 2.093 | refl |
| 18 | tertiary mirror | 5.481 | 0.56980 | $-0.6942 \times 10^{-4}$ | $-0.3119 \times 10^{-4}$ | $0.3241 \times 10^{-5}$ | 2.256 | refl |
| — | window | ∞ | — | — | — | — | 0.060 | Ge (n = 4.0) |
|  |  | ∞ | — | — | — | — | 0.100 | air |
| 20 | focal surface | ∞ | — | — | — | — | — | — | field of view: 9.9° V × 27.0° H
field offset: 44° to center
aperture stop size: 1.1 V × 3.83 H The system 10 is from the WALRUS family, since it is a non-relayed three-mirror form with a mirror power distribution of negative, positive, positive used on-axis in aperture and off-axis in field. By locating the fold mirror 16 between the secondary 14 and tertiary 18 mirrors, the optical path is folded back with the secondary 14 and tertiary 18 mirrors adjacent to one another. The length of the system 10 is reduced and the packaging of the optics for the application is considerably improved. Also, by locating the system aperture stop 26 at the fold mirror 16, and applying a higher order aspheric surface departure to the fold mirror 16, the spherical aberration of the system 10 is easily corrected, even for very fast optical speeds. The three powered mirrors 12, 14 and 18 of the telescope together with the fold mirror 16 form a compact optical system which provides a wide two-dimensional field of view and a very fast optical speed. Fields of view exceeding 20° by 40° can be achieved simultaneously with optical speeds as fast as F/1.0.

In the present invention, the optical speed is on the order of F/1.0. To provide such a speed, the invention has a large aperture in both the vertical and horizontal planes. In the present invention, the field of view is at least 13.5° vertical by 27° horizontal. Since the aperture growth in the vertical plane must be accompanied by an With respect to both tables: [(+) thicknesses are to the right; (+) radii have centers to the right; (+) decenters are up; (+) tilts are counterclockwise; decenters done before tilts] surface figure departures according to the equation:

$$Z = \frac{cp^2}{\sqrt{1 + 1 - (K+1)c^2\rho^2}} + d\rho^4 + e\rho^6 + f\rho^8 + g\rho^{10}$$

where:
Z=surface SAG
C=1/RD
K=CC=Conic Constant=-(Eccentricity)$^2$
$\rho^2=x^2+y^2$ One advantage provided by the system 10 is that the total length of the design has been shortened by folding the optical train between the secondary and tertiary mirrors 14 and 18 at the system aperture stop 26. Also the fold mirror 16 includes higher order aspheric coefficients which correct the spherical aberration. Further, the optical speed of the system 10 has been dramatically increased by utilizing a larger, non-circular aperture and increasing the offset of the field of view to accommodate the larger aperture.

The compact all-reflective optical system may be utilized in a vision enhancement system. The vision enhancement system may be used to provide thermal imagery in the 8 to 12 micron range using a room temperature detector. The optical system of the present invention will be producible in large quantities at very reasonable prices.

It should be understood that while this invention has been described in connection with the particular example hereof, that various modifications, alterations, variations and changes of the present embodiment can be made after having the benefit of the study of the specification, drawings and subjoined claims.

What is claimed is:

1. A wide angle large reflective unobscured system comprising:
   a primary reflective element adapted to receive energy;
   a secondary reflective element for receiving energy reflected from said primary reflective element, said primary and secondary reflective elements cooperating to reimage a virtual entrance pupil to a real aperture stop;
   a tertiary reflective element; and
   reflective means for reflecting energy from said secondary reflective element to said tertiary element.

2. The wide angle large reflective unobscured system as set forth in claim 1, wherein said reflective means is positioned at the aperture stop of the system.

3. The wide angle large reflective unobscured system as set forth in claim 1, having a field of view of about 13.5° vertical by 27° horizontal.

4. The wide angle large reflective unobscured system as set forth in claim 1, wherein said reflective means is a fold reflective element.

5. A wide angle large reflective unobscured system comprising:
   a primary mirror having a desired surface configuration, said primary mirror positioned to receive and reflect energy from a scene to be viewed;
   a secondary mirror having a desired surface configuration and positioned to receive energy from said primary mirror, said primary and secondary mirrors forming a real image of a virtual entrance pupil at an aperture stop;
   a tertiary mirror having a desired surface configuration and positioned to receive energy from said secondary mirror and reflecting and focusing energy to a viewing plane; and
   a fold mirror positioned at the aperture stop for reflecting energy to said tertiary mirror, said fold mirror having a desired surface configuration and said system providing a wide field of view of said viewed scene and very fast optical speed in the order of F/1.0.

6. The wide angle large reflective unobscured system as set forth in claim 5, wherein said primary mirror is a negative power mirror.

7. The wide angle large reflective unobscured system as set forth in claim 5, wherein said secondary mirror is a positive power mirror.

8. The wide angle large reflective unobscured system as set forth in claim 5, wherein said tertiary mirror is a positive power mirror.

9. The wide angle large reflective unobscured system as set forth in claim 5, wherein said secondary and tertiary mirrors are positioned adjacent one another.

10. The wide angle large reflective unobscured system as set forth in claim 5, wherein said mirrors are used on-axis in aperture and off-axis in field.

11. The wide angle large reflective unobscured system as set forth in claim 5, wherein said fold mirror has a higher order aspheric surface.

12. The wide angle large reflective unobscured system as set forth in claim 5, wherein said fold mirror has a non-planar surface.

13. The wide angle large reflective unobscured system as set forth in claim 5, wherein the field of view is about 13.5° vertical and about 27° horizontal.

14. A system comprising:
   a primary mirror;
   a secondary mirror in optical communication with said primary mirror;
   a fold mirror in optical communication with said secondary mirror;
   an aperture stop located at said fold mirror; and
   a tertiary mirror in optical communication with said fold mirror.

15. The system of claim 14 further comprising a detector in optical communication with said tertiary mirror.

16. The system of claim 15, wherein said primary, secondary and tertiary mirrors are powered mirrors, and wherein said fold mirror is a non-powered mirror.

17. The system of claim 16, wherein said primary mirror is a negative-powered mirror, and said secondary and tertiary mirrors are positive-powered mirrors.

18. The system of claim 16, wherein said fold mirror has a higher order aspheric surface.

19. The system of claim 15, wherein said mirrors provide a zero Petzval curvature.

* * * * *